(12) United States Patent
Yamada (10) Patent No.: US 8,749,842 B2
(45) Date of Patent: Jun. 10, 2014

(54) IMAGE PROCESSOR (75) Inventor: Ryuji Yamada, Ogaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 520 days.

(21) Appl. No.: 13/050,309

(22) Filed: Mar. 17, 2011

(65) Prior Publication Data
US 2011/0249281 A1 Oct. 13, 2011

(30) Foreign Application Priority Data

Apr. 7, 2010 (JP) ................................. 2010-088675

(51) Int. Cl.
*H04N 1/60* (2006.01)
*G03F 3/08* (2006.01)
*G06K 9/00* (2006.01)

(52) U.S. Cl.
USPC ............ 358/1.9; 358/520; 358/523; 382/167; 382/162

(58) Field of Classification Search
USPC .......... 358/1.9, 515, 518, 500, 501, 502, 504, 358/520, 523, 529, 530, 540; 382/162, 164, 382/165, 166
See application file for complete search history.

(56) References Cited

U.S. PATENT DOCUMENTS

| 6,031,627 | A  * | 2/2000  | Kakutani ........................ 358/1.9 |
| 7,298,522 | B2   | 11/2007 | Sugimoto |
| 7,407,242 | B2 * | 8/2008  | Piatt et al. .......................... 347/7 |
| 8,472,079 | B2 * | 6/2013  | Miyake et al. ................. 358/2.1 |
| 2002/0113982 | A1 * | 8/2002  | Chang et al. .................... 358/1.9 |
| 2002/0141770 | A1 * | 10/2002 | Shimura .......................... 399/49 |
| 2003/0043392 | A1   | 3/2003  | Sugimoto |
| 2003/0047099 | A1 * | 3/2003  | Hanyu ........................... 101/484 |
| 2004/0262378 | A1 * | 12/2004 | Ooki .............................. 235/375 |

(Continued)

FOREIGN PATENT DOCUMENTS

EP    2 023 598 A1    2/2009
JP    2000-132006    5/2000

(Continued)

OTHER PUBLICATIONS

Balasubramanian R. et al., "Gamut Mapping to Preserve Spatial Luminance Variations", *IS&T/SID Color Imaging* Conference, pp. 122-128, (Nov. 1, 2000), XP-001116111.
Extended European Search Report dated Jul. 25, 2011 from related European Patent Application No. 11158706.9.

(Continued)

*Primary Examiner* — Madelein A Nguyen
(74) *Attorney, Agent, or Firm* — Scully, Scott, Murphy & Presser, PC (57) ABSTRACT

A converting unit executes a color conversion process for image data according to a normal profile when a determining unit determines that a prescribed setting is not set for the image data. The converting unit executes the color conversion process for the image data according to a colorant-saving profile configured such that an amount of colorant to be used in the colorant-saving profile is smaller than that in the normal profile when the determining unit determines that the prescribed setting is set for the image data. One of a plurality of input color values of the image data is converted to one of the plurality of output color values according to the colorant-saving profile in the color conversion process. The one of the plurality of input color values has a first hue. The one of the plurality of output color values has a second hue different from the first hue.

8 Claims, 9 Drawing Sheets

(56) References Cited

U.S. PATENT DOCUMENTS

| | | | |
|---|---|---|---|
| 2005/0046888 A1 | 3/2005 | Tomaru | |
| 2005/0068553 A1 | 3/2005 | Otake et al. | |
| 2006/0056683 A1* | 3/2006 | Komatsu | 382/162 |
| 2007/0153308 A1* | 7/2007 | Zemach et al. | 358/1.9 |
| 2007/0211277 A1* | 9/2007 | Kaneko et al. | 358/1.14 |
| 2007/0279658 A1* | 12/2007 | Ito et al. | 358/1.9 |
| 2008/0144975 A1 | 6/2008 | Shibaki et al. | |
| 2008/0174801 A1 | 7/2008 | Asai | |
| 2009/0103117 A1* | 4/2009 | Ariga et al. | 358/1.9 |
| 2009/0168108 A1* | 7/2009 | Matsushima | 358/3.06 |
| 2011/0013226 A1* | 1/2011 | Grosz et al. | 358/1.15 |
| 2011/0109927 A1* | 5/2011 | Mori | 358/1.9 |
| 2011/0141500 A1* | 6/2011 | Togami | 358/1.9 |
| 2011/0170142 A1* | 7/2011 | Ito et al. | 358/3.24 |

FOREIGN PATENT DOCUMENTS

| | | |
|---|---|---|
| JP | 2003-66781 | 3/2003 |
| JP | 2003-76097 | 3/2003 |
| JP | 2005-86289 | 3/2005 |
| JP | 2005-121993 | 5/2005 |
| JP | 2006-268441 | 10/2006 |
| JP | 2008-153725 | 7/2008 |
| JP | 2008-173882 | 7/2008 |
| WO | WO 03/049021 A1 | 6/2003 |

OTHER PUBLICATIONS

Office Action dated Jan. 10, 2012 received from the Japanese Patent Office from related Japanese Application No. 2010-088675, together with an English-language translation.

* cited by examiner

FIG.3

(A) あ あ あ   NORMAL PROFILE
(COLORS OTHER THAN
TEXT COLORS)

(B) あ あ あ   CONVENTIONAL
TONER-SAVING PROFILE
(COLORS OTHER THAN
TEXT COLORS)

(C) あ あ あ   FIRST TEXT PROFILE
(COLORS OTHER THAN
TEXT COLORS)

(D) あ あ あ   NORMAL PROFILE
(TEXT COLORS)

(E) あ あ あ   CONVENTIONAL
TONER-SAVING PROFILE
(TEXT COLORS)

(F) あ あ あ   FIRST TEXT PROFILE
(TEXT COLORS)

(G) あ あ あ   SECOND TEXT PROFILE
(TEXT COLORS)

(H) あ あ あ   SECOND TEXT PROFILE
(TEXT COLORS)

IMAGE PROCESSOR

CROSS REFERENCE TO RELATED APPLICATION

This application claims priority from Japanese Patent Application No. 2010-088675 filed Apr. 7, 2010. The entire content of the priority applications is incorporated herein by reference.

TECHNICAL FIELD

The present invention relates to an image processor and a computer readable storage medium storing an image-processing program.

BACKGROUND

Techniques have been proposed for reducing the amount of colorant, such as toner, used when printing images. For example, one conventional color printing device converts a color profile to a toner-saving profile when in a toner-saving mode and uses this toner-saving profile for the printing process. To convert the color profile to a toner-saving profile when the color profile is represented by the three components lightness, chroma, and hue, the conventional device increases only the lightness component. When the color profile is expressed in the three primary colors RGB, the conventional device increases only the brightness component of each color. Thus, the image printed using this toner-saving profile requires less toner and maintains the color tones of the original image with an overall lighter and brighter appearance.

SUMMARY

However, when the quantity of colorant used in the printing operation is reduced so that the overall image becomes lighter and brighter while maintaining the color tones, colors having the same hue become indistinguishable in the printed image.

In view of the foregoing, it is an object of the present invention to provide an image processor and a computer readable storage medium storing image-processing program capable of preventing colors of the same hue from becoming indistinguishable when reducing the quantity of colorant used in a printing operation.

In order to attain the above and other objects, the present invention provides an image processor including a first determining unit and a converting unit. The first determining unit determines whether or not a prescribed setting is set for image data including a plurality of input color values. An image which corresponds to the image data, has a plurality of regions adjacent to each other. The plurality of input color values corresponds to the plurality of regions, respectively. The image data is subjected to a color conversion process for converting the plurality of input color values to a plurality of output color values. Each of the plurality of output color values indicating color value of a colorant used for printing the image. The converting unit executes the color conversion process for the image data according to a normal profile when the determining unit determines that the prescribed setting is not set for the image data. The converting unit executes the color conversion process for the image data according to a colorant-saving profile configured such that an amount of colorant to be used in the colorant-saving profile is smaller than that in the normal profile when the determining unit determines that the prescribed setting is set for the image data. One of the plurality of input color values is converted to one of the plurality of output color values according to the colorant-saving profile in the color conversion process. The one of the plurality of input color values has a first hue. The one of the plurality of output color values has a second hue different from the first hue.

Another aspect of the present invention, there is provided a non-transitory computer readable storage medium storing a set of program instructions installed on and executed by an image processor. The set of program instructions includes: determining whether or not a prescribed setting is set for image data including a plurality of input color values, an image which corresponds to the image data, having a plurality of regions adjacent to each other, the plurality of input color values corresponding to the plurality of regions, respectively, the image data being subjected to a color conversion process for converting the plurality of input color values to a plurality of output color values, each of the plurality of output color values indicating color value of a colorant used for printing the image, and executing the color conversion process for the image data according to a normal profile when it is determined that the prescribed setting is not set for the image data, and executing the color conversion process for the image data according to a colorant-saving profile configured such that an amount of colorant to be used in the colorant-saving profile is smaller than that in the normal profile when it is determined that the prescribed setting is set for the image data. One of the plurality of input color values is converted to one of the plurality of output color values according to the colorant-saving profile in the color conversion process. The one of the plurality of input color values has a first hue. The one of the plurality of output color values has a second hue different from the first hue.

BRIEF DESCRIPTION OF THE DRAWINGS

The particular features and advantages of the invention as well as other objects will become apparent from the following description taken in connection with the accompanying drawings, in which.

DETAILED DESCRIPTION

A present embodiment of the present invention will be described while referring to the accompanying drawings.

1. Structure of an Image Processor

Figure 1:
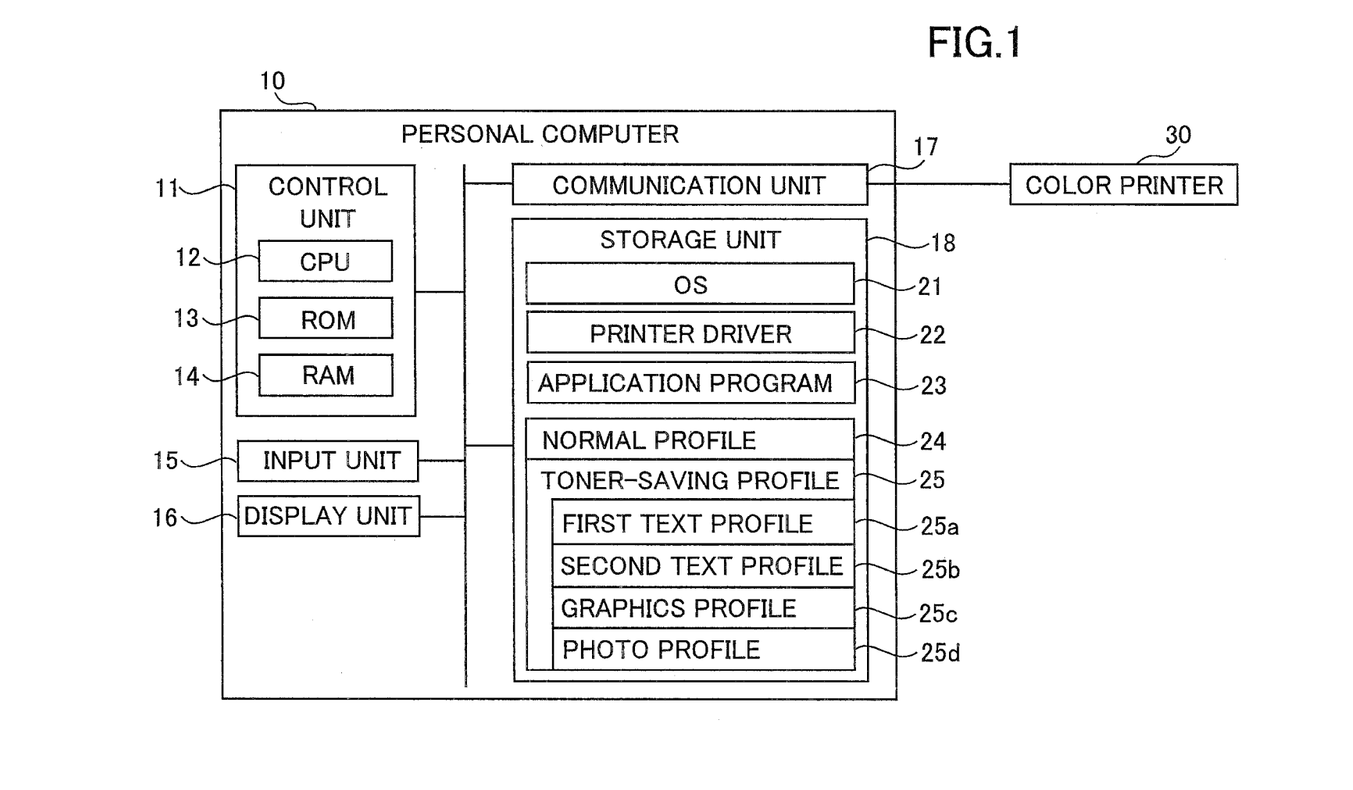
FIG. 1 is a block diagram showing a general structure of a personal computer according to an embodiment of the present invention.

FIG. 1 is a block diagram showing the general structure of a personal computer 10 serving as the image processor in the present embodiment.

The personal computer 10 includes a control unit 11, an input unit 15, a display unit 16, a communication unit 17, and a storage unit 18.

The control unit 11 has a CPU 12, a ROM 13, and a RAM 14. The control unit 11 performs overall control of each component in the personal computer 10.

The input unit 15 enables a user to input commands through external operations. The input unit 15 is configured of a keyboard and a pointing device (mouse or the like), for example.

The display unit 16 employs a display device, such as a liquid crystal display. The display unit 16 functions to display images represented by image data expressed in 256-level RGB values.

The communication unit 17 enables the personal computer 10 to communicate with an external device via a network. In the present embodiment, the communication unit 17 allows the personal computer 10 to communicate with a color printer 30. The color printer 30 is an electrophotographic printing device that can print color images using toner in the four colors cyan (C), magenta (M), yellow (Y), and black (K). The color printer 30 receives binary image data rendered as CMYK values from the personal computer 10 and prints an image on paper or another recording medium based on the image data.

The storage unit 18 is configured of a hard disk drive, for example, and functions to store various data. Various programs are installed on the storage unit 18, including an operating system (OS) 21, a printer driver 22, and application programs 23 for implementing such applications as a word processor, spreadsheet program, and presentation program (hereinafter, these applications will be collectively referred to as "office software").

The printer driver 22 is software that enables the personal computer 10 to use the color printer 30. When a user performs an operation in a running application to initiate a print, the personal computer 10, implementing the function of the printer driver 22, receives image data from the application for the image to be printed, converts the image data to CMYK binary image data that can be rendered by the color printer 30, and transfers the converted image data to the color printer 30. The image data transferred from the application is configured of drawing commands. These drawings commands are classified as text drawing commands for drawing text objects, graphics drawing commands for drawing graphics objects, and photo drawings commands for drawing photo objects.

The personal computer 10 also employs the function of the printer driver 22 to display a setup window on the display unit 16, allowing the user to input printer-related settings. In this setup window, the user can set a toner-saving mode (a printing mode for reducing the amount of toner used relative to the amount used in the normal printing mode) ON or OFF. When the toner-saving mode is set to ON, the user can select whether priority should be given to text readability or toner conservation for text objects. Settings related to toner conservation will be called toner-saving setting in the following description.

The storage unit 18 also stores a plurality of profiles for converting input color values for image data in a device color space depending on the display unit 16 (RGB data) to output color values for image data in a device color space depending on color printer 30 (CMYK data). These profiles are device link profiles for linking the device profile of the display unit 16 (ICC profile) with the device profile of the color printer 30.

More specifically, the various profiles stored in the storage unit 18 are broadly classified as a normal profile 24 and toner-saving profiles 25. The toner-saving profiles 25 are configured to suppress toner usage more than the normal profile 24 and, more specifically, in the present embodiment are configured to convert a portion of the input color values to output color values of different hues.

The toner-saving profiles 25 of the present embodiment include a first text profile 25a, a second text profile 25b, a graphics profile 25c, and a photo profile 25d. In other words, various types of toner-saving profiles 25 are prepared for each of the object types (text, graphics, and photos). In particular, two types of profiles are prepared for text objects, including the first text profile 25a emphasizing text readability, and the second text profile 25b emphasizing toner conservation. Next, each profile will be described in greater detail.

(1) First Text Profile

The first text profile 25a increases the degree at which toner use is reduced (toner saving amount) for colors other than a text color, where "text colors" are preset as colors likely to be used for text. In other words, the first text profile 25a is configured such that a ratio of toner used for text colors in the first text profile 25a to toner used for text colors in the normal profile 24 is greater than a ratio of toner used in colors other than text colors in the first text profile 25a to toner used in colors other than text colors in the normal profile 24. In the present embodiment, the text colors include color gradations ranging from white to each elementary color and from each elementary color to black. The elementary colors correspond to the primary colors (CMYK) and the secondary colors (RGB). The elementary colors in the present embodiment are defined as any color produced by setting one or more of the RGB values to their maximum value. For example, elementary colors include cyan expressed by RGB=(0, 255, 255), magenta expressed by RGB=(255, 0, 255), yellow expressed by RGB=(255, 255, 0), red expressed by RGB=(255, 0, 0), green expressed by RGB=(0, 255, 0), and blue expressed by RGB=(0, 0, 255). In addition to (or in place of) these elementary colors, color gradations ranging from white to each elementary color and color gradations ranging from each elementary color to black may be set as text colors for each of the colors considered standard colors in the office software. An intermediate color precisely in the middle of cyan and blue is expressed by RGB=(0, 128, 255). The intermediate color corresponds to a color other than the text color.

Figure 2:
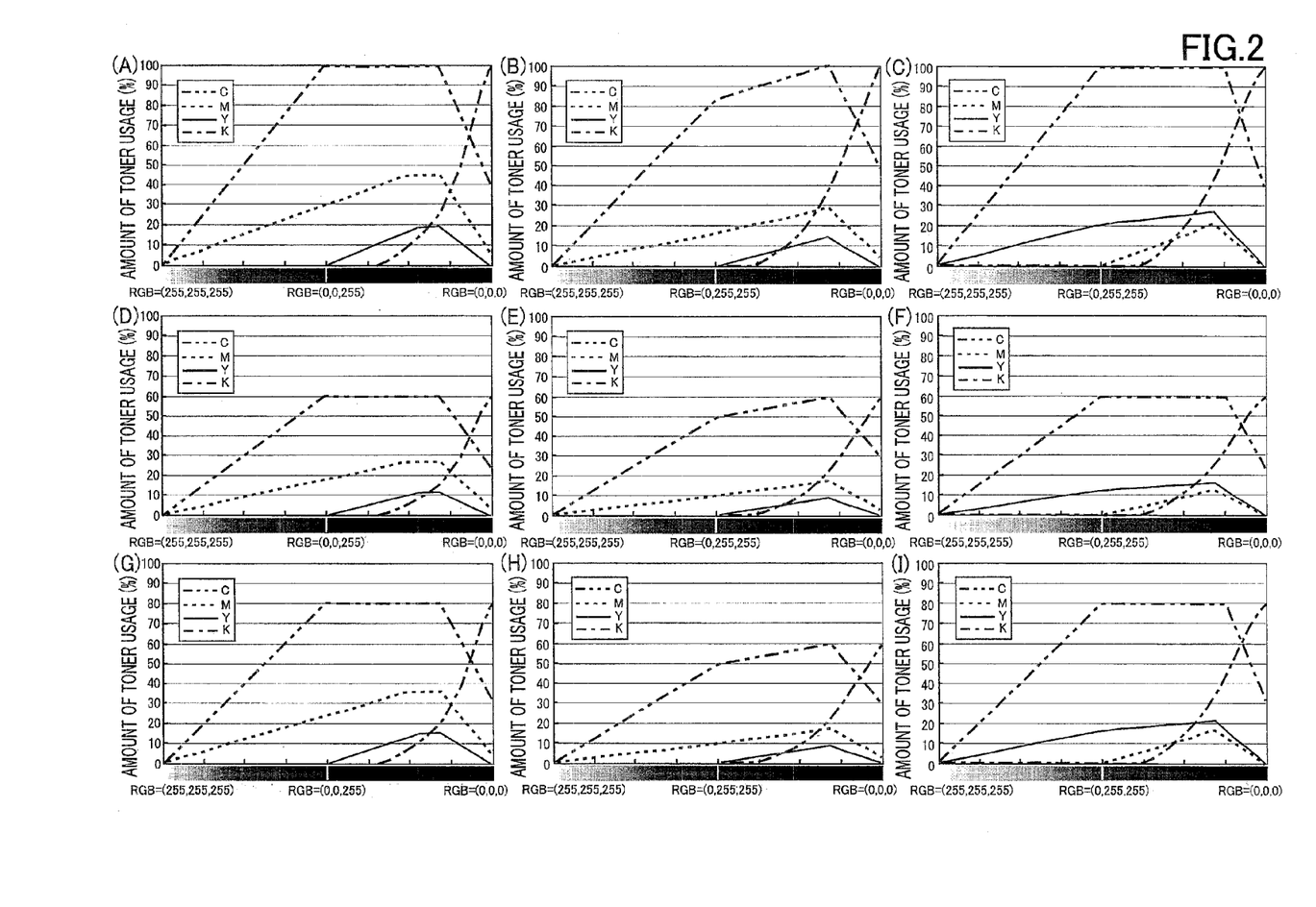
FIG. 2 is an explanatory diagram showing correlations between RGB values and CMYK values in a normal profile, a conventional toner-saving profile, and a first text profile.

FIGS. 2(A)-2(C) are graphs showing correlations between RGB values and CMYK values in the normal profile 24. Specifically, FIG. 2(A) shows CMYK values for the RGB values (255, 255, 255)→(0, 0, 255)→(0, 0, 0); FIG. 2(B) shows CMYK values for the RGB values (255, 255, 255)→(0, 128, 255)→(0, 0, 0); and FIG. 2(C) shows CMYK values for the RGB Values (255, 255, 255)→(0, 255, 255)→(0, 0, 0).

FIGS. 2(D)-2(F) are graphs showing correlations between RGB values and CMYK values in a profile (hereinafter, this profile will be referred to as the "conventional toner-saving profile") that reduces the CMYK values in FIGS. 2(A)-(C) by the same ratio (to 60% of the normal profile 24, in this example), without regard for density.

FIGS. 2(G)-(I) are graphs showing correlations between RGB values and CMYK values in the first text profile 25a according to the present embodiment. The RGB values in FIGS. 2(G)-(I) are the same as those in FIGS. 2(A)-(C). In FIGS. 2(A)-(I), the two-dot chain line indicates cyan component, the dash line indicates magenta component, the solid line indicates yellow component, and the chain line indicates black component.

As shown in FIG. 2(H), the first text profile 25a is configured to reduce CMYK values (increase the toner-saving effect) in the same way as the conventional toner-saving profile shown in FIG. 2(E) for colors other than text colors. In contrast, as shown in FIGS. 2(G) and 2(I), the first text profile 25a is configured to increase CMYK values (reduce the toner-saving effect) for text colors more than the conventional toner-saving profile, as shown in FIGS. 2(D) and 2(F). In this example, the first text profile 25a for the blue (B) component shown in FIG. 2(G) and cyan (C) component shown in FIG. 2(I) are both set to 80% of the normal profile 24, while the first text profile 25a for colors between the B component and C component shown in FIG. 2(H) are set at 60% of the normal profile 24.

Figure 3:
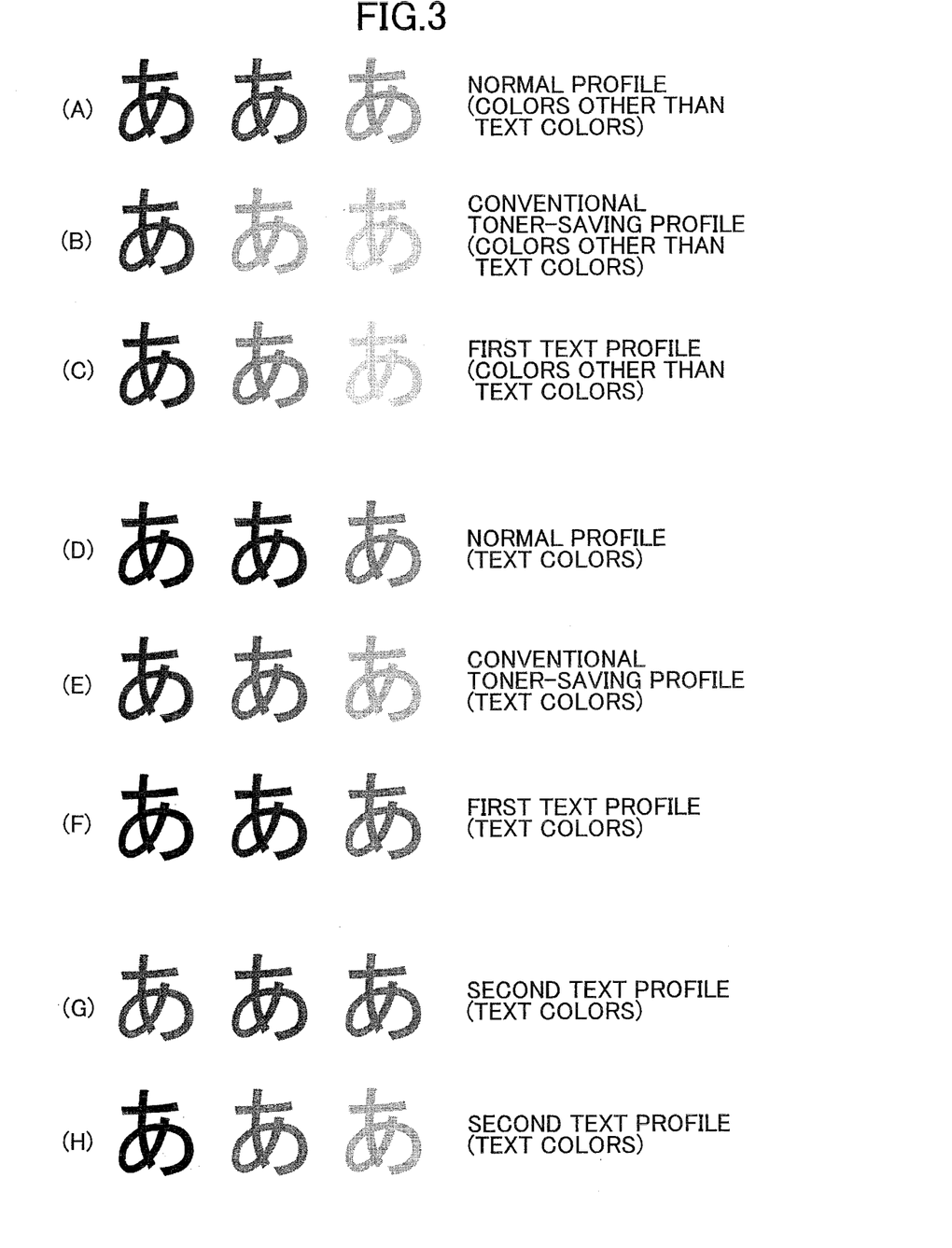
FIG. 3 shows printing results for characters according to the embodiment.

FIGS. 3(A)-(C) show the printing results for characters in colors other than text colors, and FIGS. 3(D)-(F) show the printing results for characters in the text colors. Further, FIGS. 3(A) and 3(D) show printing results when using the normal profile 24; FIGS. 3(B) and 3(E) show printing results when using the conventional toner-saving profile; and FIGS. 3(C) and 3(F) show printing results when using the first text profile 25a.

As shown in FIGS. 3(A)-(C), characters in colors other than text colors when using either the conventional toner-saving profile or the first text profile 25a are formed lighter than characters in colors other than text colors when using the normal profile 24. However, characters formed in a text color when using the first text profile 25a are easier to read than characters formed in a text color when using either the conventional toner-saving profile or the normal profile 24, as shown in FIGS. 3(D)-(F).

(2) Second Text Profile

Figure 4:
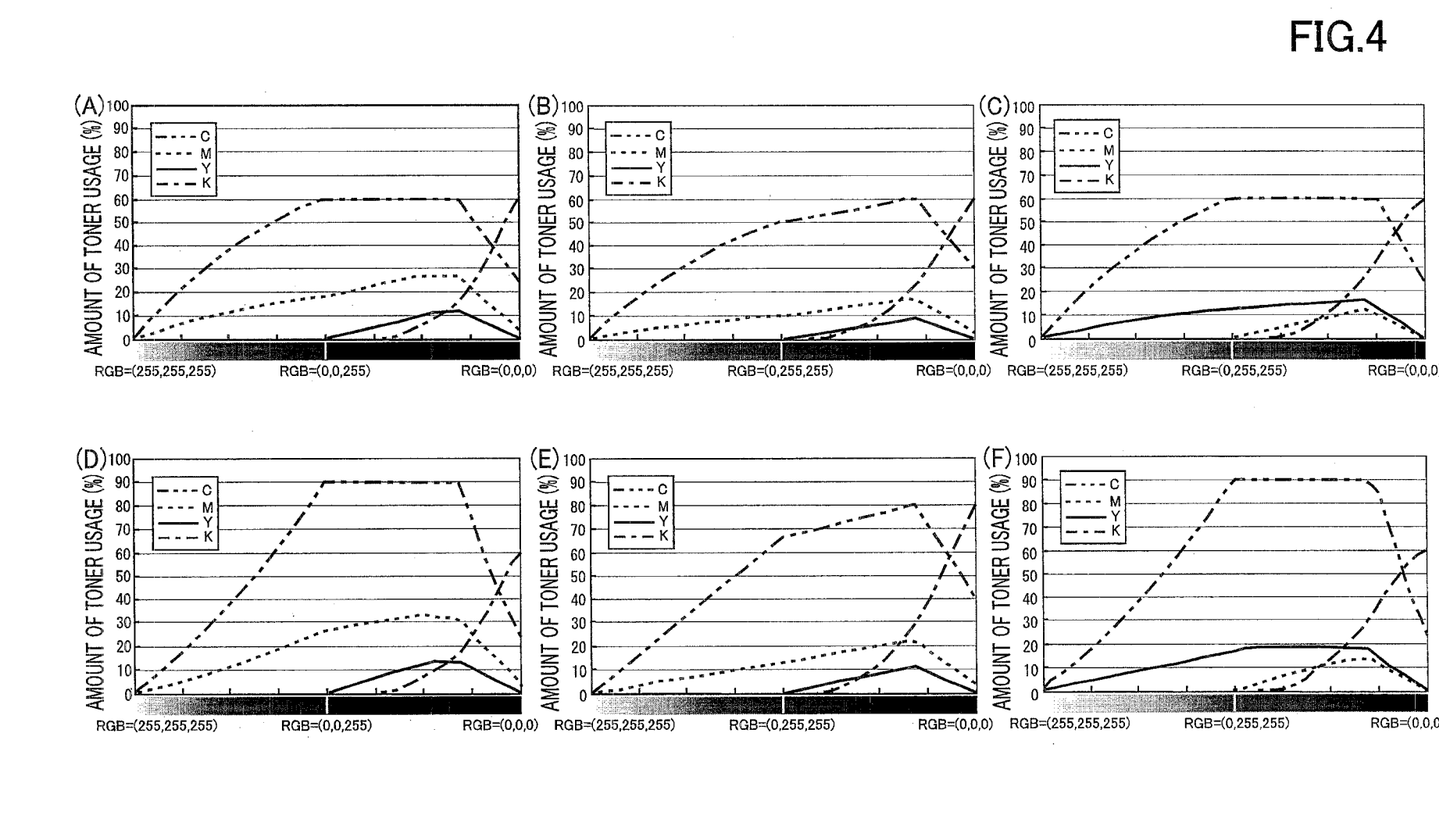
FIG. 4 is an explanatory diagram showing correlations between RGB values and CMYK values in the second text profile.

The second text profile 25b is configured to increase a degree at which the amount of colorant is reduced, for colors in dark region of the image more than for colors in light region in the image. In other words, the second text profile 25b configured such that a ratio of the toner amount used for a light color in the second text profile 25b to the toner amount of the light color in the normal profile 24 is greater than a ratio of the toner amount used for a dark color in the second text profile 25b to the toner amount of the dark color in the normal profile 24. FIGS. 4(A)-(C) are graphs showing correlations between RGB values and CMYK values in the second text profile 25b. The RGB values in FIGS. 4(A)-(C) are identical to those in FIGS. 2(A)-(C) described above.

As shown in FIGS. 4(A) and 4(C), the second text profile 25b is configured to reduce CMYK values (increase the toner-saving effect) for text colors more than the first text profile 25a, as shown in FIGS. 2(G) and 2(I). More particularly, the second text profile 25b in the present embodiment lessens toner reduction in light areas (color gradations from white to the elementary colors) and increases toner reduction in dark areas (color gradations from the elementary colors to black), thereby effectively reducing the quantity of toner used, while preventing lighter characters from becoming difficult to read.

FIG. 3(G) shows printing results for characters in a text color when using the second text profile 25b. While the second text profile 25b prevents lighter text from becoming difficult to read, characters near the elementary colors in particular are made lighter than when using the first text profile 25a.

(3) Graphics Profile

The graphics profile 25c changes hues in colors set as standard colors in the office software so that gradations of the same hue are rendered in a plurality of hues. In other words, the graphics profile 25c changes hues in colors such that a plurality of input color values each having a same hue is converted to a plurality of output color values having a first hue and a second hue different from the first hue.

Figure 5:
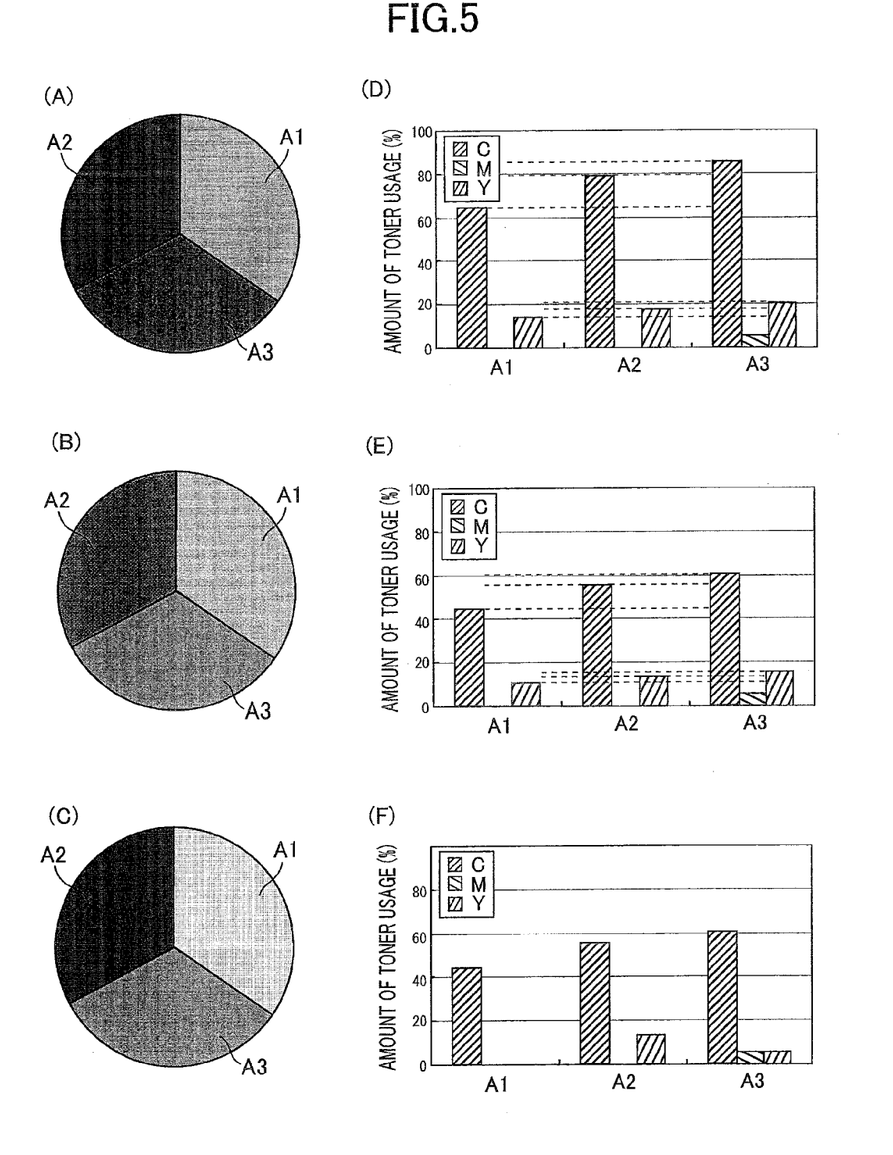
FIG. 5 shows results of printing a graphic and bar graphs showing the amount of toner.

FIGS. 5(A)-(C) show the results of printing a graphic (a pie chart in this example) rendered in three colors A1, A2, and A3 of the same hue. FIG. 5(A) shows the printing results when using the normal profile 24. FIG. 5(B) shows the printing results when using the conventional toner-saving profile. FIG. 5(C) shows the printing results when using the graphics profile 25c. FIGS. 5(D)-(F) are bar graphs showing the amount of toner used in the respective printing examples shown in FIGS. 5(A)-(C).

Since the conventional toner-saving profile reduces the amount of toner usage of the normal profile 24 shown in FIG. 5(D) by a fixed ratio, as shown in FIG. 5(E), the differences between color components in the three colors A1, A2, and A3 of the same hue are small, making it difficult to distinguish the colors A1, A2, and A3 in the printed graphic, as shown in FIG. 5(B). In contrast, the graphics profile 25c intentionally shifts at least one of the hues of the colors A1, A2, and A3 by reducing a specific color component more than (or not reducing the specific color component as much as) the conventional toner-saving profile. In this example, the graphics profile 25c reduces the yellow (Y) component of colors A1 and A3 more than the conventional toner-saving profile, as shown in FIG. 5(F). Consequently, an original hue of colors A1 and A3 is changed to a hue closer to blue than that of color A2, making it easier to distinguish colors A1, A2, and A3 in the printed graphic, as shown in FIG. 5(C). The changed hue of colors A1 and A3 is different from the original hue. In the present embodiment, the graphics profile 25c reduces the specific color in the color components such that a color difference between colors in regions adjacent to each other is more than 8. If the color difference is more than 8, the user can distinguish the colors in regions adjacent to each other. The color difference is determined based on Lab values obtained by converting the CMYK values for the colors of the adjacent regions.

(4) Photo Profile

Figure 6:
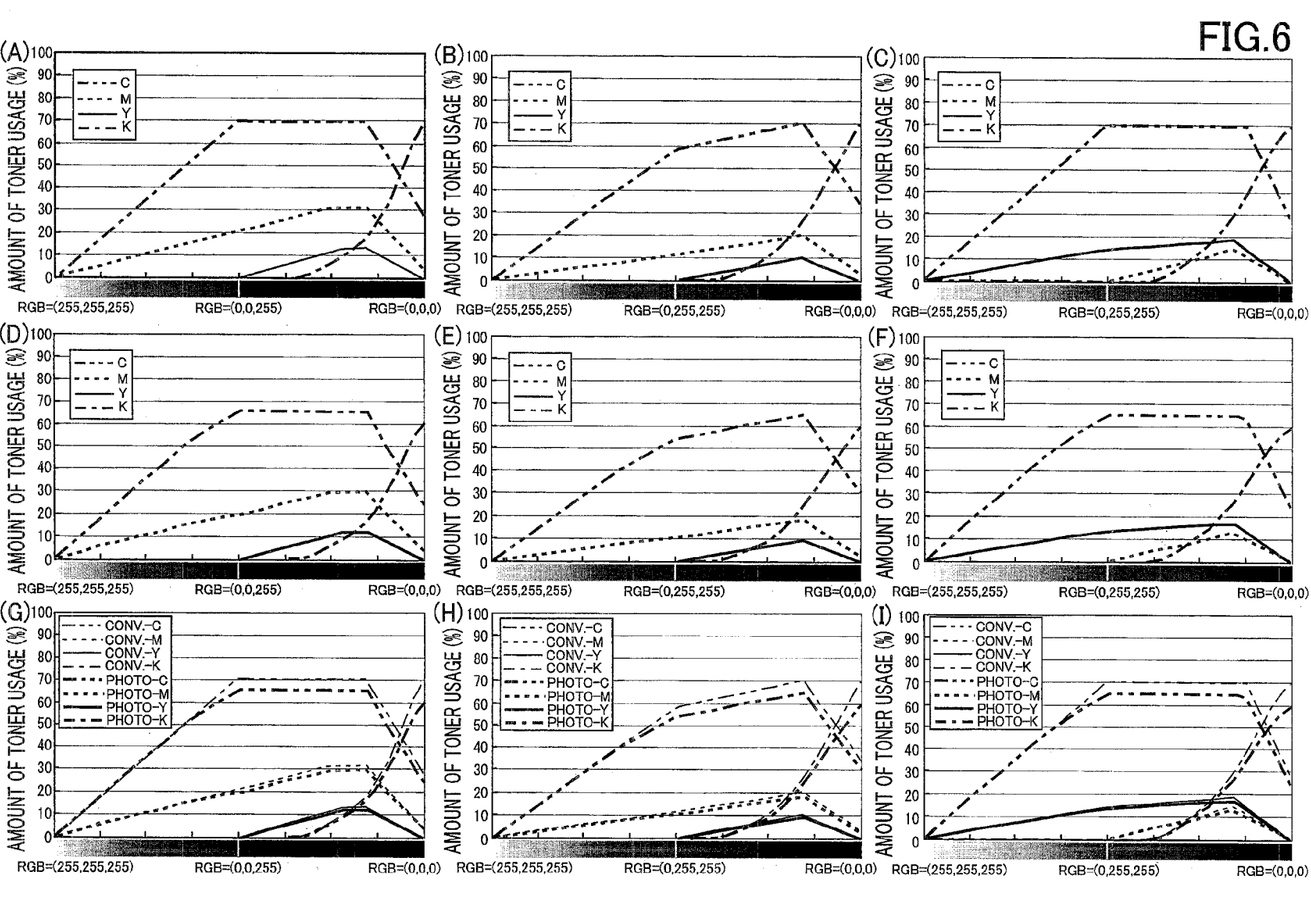
FIG. 6 is an explanatory diagram showing correlations between RGB values and CMYK values in a conventional toner-saving profile and a photo profile.

The photo profile 25d is configured to increase the reduction of toner used for colors in dark regions of an image more than for colors in light regions. In other words, the photo profile is configured such that a ratio of the toner amount used for colors in a light region in the image is greater than a ratio of the toner amount used for colors in a dark region in the image. FIGS. 6(A)-(C) are graphs showing correlations between RGB values and CMYK values of the conventional toner-saving profile, which reduces the CMYK values in FIGS. 2(A)-(C) by the same ratio (to 70% of the normal profile 24, in this example), regardless of density. Further, FIGS. 6(D)-(F) are graphs showing correlations between RGB values and CMYK values in the photo profile 25d. The RGB values in FIGS. 6(D)-(F) are identical to those in FIGS. 2(A)-2(C).

Further, FIGS. 6(G)-(I) are graphs showing the conventional toner-saving profile in FIGS. 6(A)-(C) superimposed on the photo profile 25d in FIGS. 6(D)-(F). In FIGS. 6(G)-(I), the lines indicating the conventional toner-saving profile are thinner than the lines indicating the photo profile 25d.

As shown in FIGS. 6(G)-(I), the photo profile 25d (see FIGS. 6(D)-(F)) is configured to reduce CMYK values in dark regions of an image more than the conventional toner-saving profile (FIGS. 6(A)-(C)).

2. Image Data Generation Process

Figure 7:
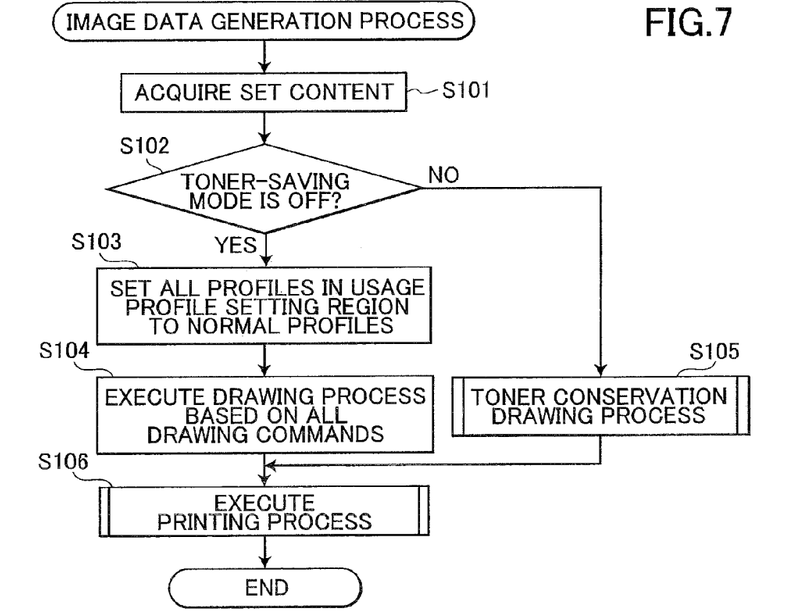
FIG. 7 is a flowchart illustrating steps in an image data generation process according to the embodiment.

Next, an image data generation process will be described with reference to the flowchart in FIG. 7. The control unit 11 (and more specifically the CPU 12) executes the image data generation process as a function of the printer driver 22 to produce image data for printing. The control unit 11 begins executing the image data generation process when the user performs an operation to initiate a printing operation in an application running on the personal computer 10.

In S101 at the beginning of the image data generation process, the control unit 11 acquires a set content for the toner-saving setting inputted by the user. In S102 the control unit 11 determines whether or not the toner-saving mode is set to OFF based on the set content of the toner-saving setting acquired in S101.

If the control unit 11 determines in S102 that the toner-saving mode is set to OFF, in S103 the control unit 11 sets all setting values in a usage profile setting region to values indicating the normal profile 24. Here, the "usage profile setting region" is a region prepared in the RAM 14 for storing the type of profile to be the usage profile used in color conversion processes for each pixel constituting the image targeted for printing.

Figure 8:
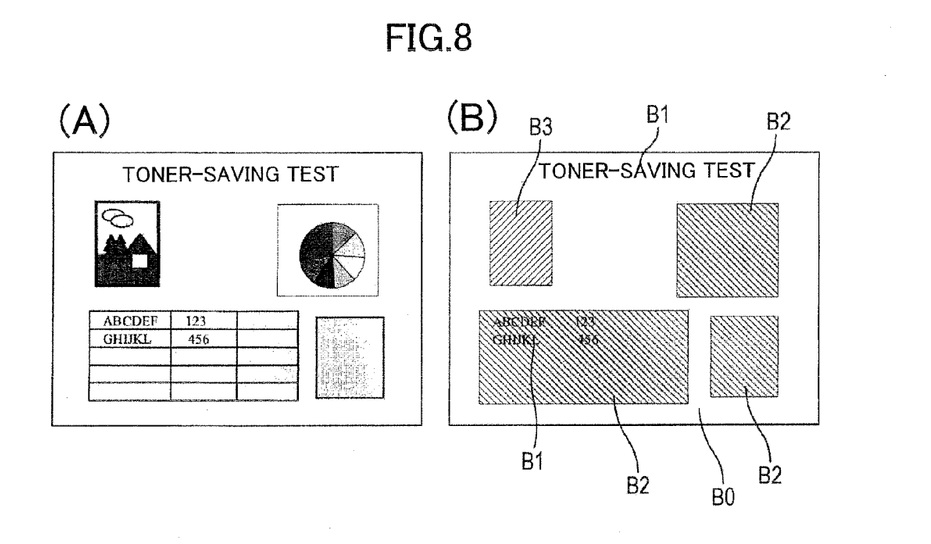
FIG. 8 is an explanatory diagram showing a sample image to be printed and an usage profile setting region according to the embodiment.

FIG. 8(A) shows a sample image to be printed. FIG. 8(B) is a conceptual diagram of the usage profile setting region in which profile settings are set for the image shown in FIG. 8(A). In FIG. 8(B) a setting value indicating the normal profile 24 is set for each pixel in a region B0 rendered in white, a setting value indicating a text profile is set for each pixel in a region B1 rendered in black (black text), a setting value indicating the graphics profile 25c is set for each pixel in a region B2, and a setting value indicating the photo profile 25d is set for each pixel in a region B3.

More specifically, the setting value is set to "0" when the usage profile is the normal profile 24, "1" when the usage profile is the text profile, "2" when the usage profile is the graphics profile 25c, and "3" when the usage profile is the photo profile 25d. Hence, in S103 the control unit 11 sets the setting value for all pixels in the usage profile setting region to "0", indicating the normal profile 24. Note that "1" stored in the usage profile setting region to indicate the text profile is used for both the first text profile 25a and second text profile 25b, because there is no need to differentiate between the two.

In S104 the control unit 11 executes a drawing process based on all drawing commands constituting the image data representing the image being printed. Through this process, image data configured of drawing commands is developed into 256-level RGB data (is rasterized). Subsequently, the control unit 11 advances to S106.

However, if the control unit 11 determines in S102 that the toner-saving mode is set to ON, in S105 the control unit 11 executes a toner conservation drawing process to develop image data configured of drawing commands into 256-level RGB data, and subsequently advances to S106. The toner conservation drawing process will be described later in greater detail with reference to FIG. 9.

In S106 the control unit 11 executes a printing process by performing a color conversion process, a calibration process, and a thresholding process on the 256-level RGB data representing the image being printed, and subsequently ends the image data generation process. The printing process will be described later in greater detail with reference to FIG. 10.

Figure 9:
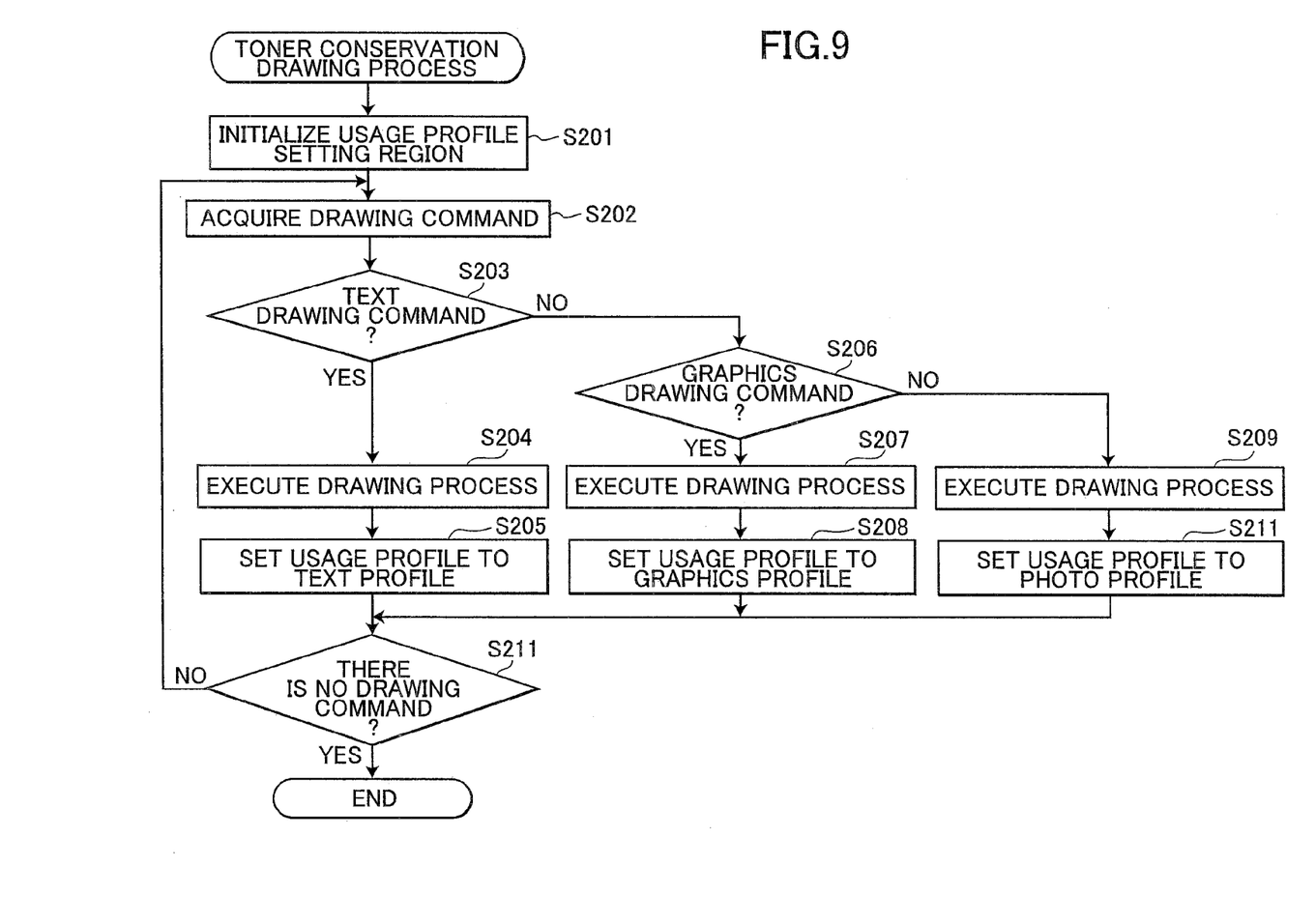
FIG. 9 is a flowchart illustrating steps in a toner conservation drawing process shown FIG. 7.

Next, the toner conservation drawing process executed in S105 of the above image data generation process will be described with reference to the flowchart in FIG. 9. In S201 at the beginning of the toner conservation drawing process, the control unit 11 initializes the usage profile setting region. In this initialization process, the control unit 11 sets the setting value (a value indicating the type of the usage profile) for each pixel in the usage profile setting region to "0", indicating the normal profile 24.

In S202 the control unit 11 acquires a drawing command to be subjected to the process in S203-S210 described below from among all drawing commands constituting the image data that represents the image being printed, where the drawing command is one that has not yet been subjected to this process. Note that drawing commands for objects that overlap one another in the image being printed are acquired in an order that ensures the object positioned on top is processed last. Accordingly, in regions where objects overlap, the control unit 11 sets the type of the usage profile based on the drawing command for the object positioned on top.

In S203 the control unit 11 determines whether the drawing command acquired in S202 is a text drawing command. If the drawing command is determined to be the text drawing command, in S204 the 11 executes a drawing process based on this drawing command. Through this process, the drawing command is developed into 256-level RGB data representing a text object.

In S205 the control unit 11 sets the setting values for pixels corresponding to the drawing region for drawing the RGB data generated in S204 to "1", indicating a text profile. That is, the control unit 11 sets the usage profile for all pixels constituting the text object developed in S204 to the text profile. Subsequently, the control unit 11 advances to S211.

However, if the control unit 11 determines in S203 that the drawing command is not a text drawing command, in S206 the control unit 11 determines whether the drawing command is a graphics drawing command. If the drawing command is determined to be the graphics drawing command, in S207 the control unit 11 executes a drawing process based on the drawing command. Through this process, the control unit 11 develops the drawing command into 256-level RGB data representing a graphics object.

In S208 the control unit 11 sets the setting values for pixels corresponding to the drawing region for drawing the RGB data generated in S207 to "2", indicating the graphics profile 25c. That is, the control unit 11 sets the usage profile for all pixels constituting the graphics object developed in S207 to the graphics profile 25c. Subsequently, the control unit 11 advances to S211.

However, if the control unit 11 determines in S206 that the drawing command is not a graphics drawing command, i.e., that the command is a photo drawing command, in S209 the control unit 11 executes a drawing process based on the drawing command. Through this process, the control unit 11 develops the drawing command into 256-level RGB data representing a photo object.

In S210 the control unit 11 sets the setting values for pixels corresponding to the drawing region for drawing the RGB data generated in S209 to "3", indicating the photo profile 25d. That is, the control unit 11 sets the usage profile for all pixels constituting the photo object developed in S209 to the photo profile 25d. Subsequently, the control unit 11 advances to S211.

In S211 the control unit 11 determines whether there remain any drawing commands that have not been subjected to the process in S203-S210. In other words, the control unit 11 determines whether the above process has been executed on all drawing commands constituting the image data that represents the image being printed.

The control unit 11 returns to S202 when determining in S211 that there remain unprocessed drawing commands, and ends the current toner conservation drawing process when determining that there remain no unprocessed drawing commands.

Figure 10:
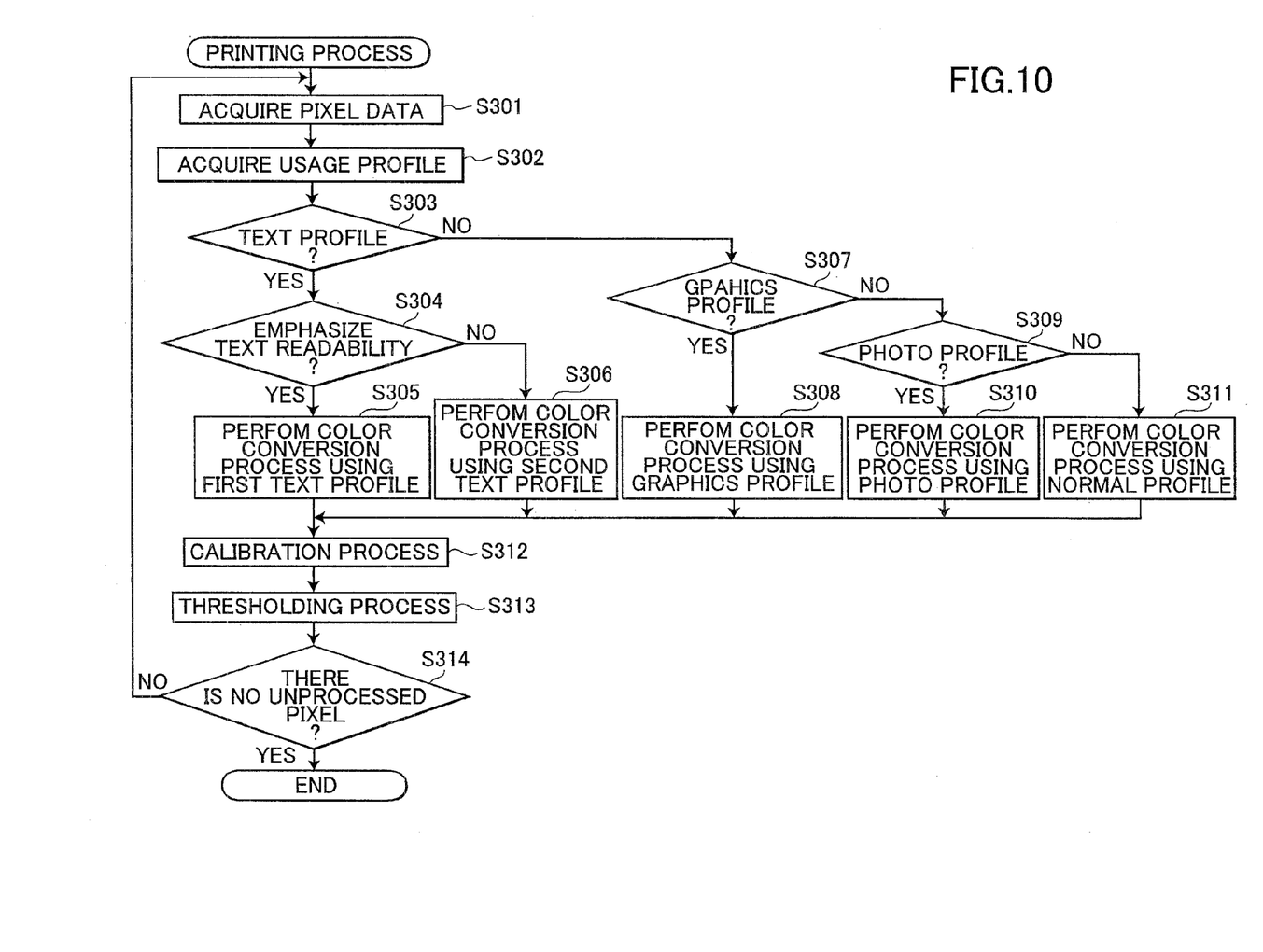
FIG. 10 is a flowchart illustrating steps in a printing process shown in FIG. 7.

Next, the printing process executed in S106 of the above image data generation process will be described with reference to the flowchart in FIG. 10. In S301 at the beginning of the printing process, the control unit 11 acquires pixel data (RGB values) for a pixel constituting the image being printed that has not yet been subjected to the process in S302-S313 described below.

In S302 the control unit 11 acquires the usage profile set for the pixel data acquired in S301 from the usage profile setting region. In S303 the control unit 11 determines whether the usage profile acquired in S302 is a text profile.

If the control unit 11 determines in S303 that the usage profile is the text profile, in S304 the control unit 11 determines whether the toner-saving settings have been set to emphasize text readability.

If the control unit 11 determines in S304 that the toner-saving settings have been set to emphasize text readability, in S305 the control unit 11 performs a color conversion process using the first text profile 25a, which emphasizes text readability. Subsequently, the control unit 11 advances to S312.

However, if the control unit 11 determines in S304 that the toner-saving settings have not been set to emphasize text readability, but rather to emphasize toner conservation, in S306 the control unit 11 performs the color conversion process using the second text profile 25b, which emphasizes toner conservation. Subsequently, the control unit 11 advances to S312.

Further, if the control unit 11 determines in S303 that the usage profile is not the text profile, in S307 the control unit 11 determines whether the usage profile acquired in S302 is the graphics profile 25c.

If the control unit 11 determines in S307 that the usage profile is the graphics profile 25c, in S308 the control unit 11 performs the color conversion process using the graphics profile 25c, and subsequently advances to S312.

However, if the control unit 11 determines in S307 that the usage profile is not the graphics profile 25c, in S309 the control unit 11 determines whether the usage profile is the photo profile 25d.

If the usage profile is the photo profile 25d, in S310 the control unit 11 performs the color conversion process using the photo profile 25d, and subsequently advances to S312.

However, if the control unit 11 determines in S309 that the usage profile is not the photo profile 25d, i.e., that the usage profile is the normal profile 24, in S311 the control unit 11 performs the color conversion process using the normal profile 24, and subsequently advances to S312.

In S312 the control unit 11 performs a calibration process to correct the CMYK values produced in the color conversion process. In S313 the control unit 11 performs a thresholding process to convert the calibrated 256-level CMYK data to binary data.

In S314 the control unit 11 determines whether there remain any pixels that have not yet been subjected to the process in S302-S313 described above. In other words, the control unit 11 determines whether the above process has been executed on all pixels constituting the image being printed.

The control unit 11 returns to S301 when determining in S314 that there remain unprocessed pixels, and ends the current printing process when determining in S314 that there remain no unprocessed pixels.

3. Effects of the Invention

As described above, when the toner-saving mode is set to ON, the personal computer 10 according to the present embodiment performs a color conversion process using one of the toner-saving profiles 25, which are configured to suppress toner usage more than the normal profile 24. The toner-saving profiles 25 are configured to convert a portion of the input color values to output color values having different hues. Accordingly, the toner-saving profiles 25 can more effectively reduce the amount of toner usage while preventing colors having the same hues from becoming indistinguishable in the printed image.

Further, since the personal computer 10 reduces toner usage through the device link profile, there is less chance that image quality will suffer than when using a device profile. That is, while it is possible to reduce toner usage through the device profile of the display unit 16, for example, there is no way to control what colors are produced in a printing operation on the color printer 30 without linking to the device profile of the color printer 30. If the color gamut of the color printer 30 is narrower than expected, unintended gamut mapping will occur, upsetting the color balance and lowering image quality. However, since the personal computer 10 according to the present embodiment employs the device link profile to reduce toner usage, this drop in image quality is less likely to occur.

The personal computer 10 also performs the color conversion process using the toner-saving profile 25 based on the type of object. Therefore, the personal computer 10 can more effectively reduce toner usage based on the type of object.

More specifically, the personal computer 10 performs the color conversion process on text objects using either the first or second text profile 25a or 25b, which profiles vary the degree at which toner usage is reduced, depending on whether the text object is printed in a text color or color other than the text colors. In this way, the personal computer 10 can more effectively reduce toner usage than when not differentiating between text colors and colors other than text colors. In other words, when the first text profile 25a is used in the color conversion process, the personal computer 10 can prevent characters in a text color from becoming illegible in the printed image. Conversely, when using the second text profile 25b in the color conversion process, the personal computer 10 can further reduce toner usage. By performing color conversion processes based on a user-specified profile, the personal computer 10 according to the present embodiment can select the most suitable profile to meet the user's preference, i.e., when the user wishes to prevent characters in a text color from becoming unreadable or when the user wishes to further decrease toner usage.

For graphics objects, the personal computer 10 performs color conversion processes using the graphics profile 25c, which is configured to render gradations of the same hue (a single hue) in a plurality of hues. Therefore, the personal computer 10 can more efficiently reduce toner usage while preventing graphical colors rendered in gradations of the same hue from becoming indistinguishable from each other.

For photo objects, the personal computer 10 performs color conversion processes using the photo profile 25d, which is configured to reduce toner usage at a higher degree for colors in dark regions of an image more than for colors in light regions. Therefore, the personal computer 10 can more efficiently reduce toner usage while preventing light regions of a photo from becoming so light as to be unrecognizable.

5. Variations of the Embodiment

While the invention has been described in detail with reference to specific embodiments thereof, it would be apparent to those skilled in the art that many modifications and variations may be made therein without departing from the spirit of the invention, the scope of which is defined by the attached claims.

In the present embodiment described above, the second text profile 25b, which increases the degree at which toner is reduced in text colors more than colors other than text colors, is configured to reduce the amount of toner reduction in light areas and increase the amount of toner reduction in dark areas. However, since text is generally printed in elementary colors, this second text profile may be configured to make text printed in elementary colors more readable by increasing the toner-saving quantity in light areas while reducing the toner-saving quantity in colors around the elementary colors. Specifically, the profile may be configured to further increase CMYK values that render the elementary colors, as shown in FIGS. 4(D)-4(F), for example. This configuration will ensure that characters in elementary colors are more readable, as illustrated in FIG. 3(H).

In the present embodiment described above, the user is prompted to specify whether to emphasize readability or toner conservation when the toner-saving mode is set to ON, but this user-setting may be omitted. When the setting is omitted, in place of steps S304-S306 described above, the control unit 11 may perform the color conversion process using a universal text profile that combines elements from the first and second text profile 25a and 25b.

In the present embodiment described above, the ON/OFF setting of the toner-saving mode is set by the user. However, this mode may be automatically set by the personal computer 10 based on the image content or the amount of remaining toner, for example.

Although toner is used as an example of colorant in the present embodiment, the colorant may also be ink or the like. Further, the image data generation process described in the present embodiment is executed on the personal computer 10, but this process may be performed on the printing device, for example.

What is claimed is:

1. An image processor comprising:
   a processor; and
   a memory storing instructions that, when executed by the processor, causes the image forming device to perform:
   determining whether or not a prescribed setting is set for image data including a plurality of input color values, an image which corresponds to the image data, having a plurality of regions adjacent to each other, the plurality of input color values corresponding to the plurality of regions, respectively, the image data being subjected to a color conversion process for converting the plurality of input color values to a plurality of output color values, each of the plurality of output color values indicating color value of a colorant used for printing the image, the image data having object data corresponding to an object to be printed in the image,
   judging a type of the object included in the image; and
   executing, when the processor determines that the prescribed setting is not set for the image data, the color conversion process for the image data according to a normal profile, and that, when the processor determines the prescribed setting is set for the image data, the color conversion process for the image data according to a colorant-saving profile configured such that an amount of colorant to be used in the colorant-saving profile is smaller than that in the normal profile,
   wherein one of the plurality of input color values is converted to one of the plurality of output color values according to the colorant-saving profile in the color conversion process, the one of the plurality of input color values having a first hue, the one of the plurality of output color values having a second hue different from the first hue;
   wherein the colorant-saving profile includes a plurality of colorant-saving profiles, the plurality of colorant-saving profiles including a text colorant-saving profile configured such that a ratio of the colorant amount used for a text color in the text colorant-saving profile to the colorant amount used for the text color in the normal profile greater than a ratio of the colorant amount used for a color other than the text color in the text colorant-saving profile to the colorant amount used for the colors other than the text color in the normal profile, the text color being preset as a color to be used for text, and
   wherein the processor executes, when the processor judges the type of the object as a text, the color conversion process according to the text colorant-saving profile.

2. The image processor according to claim 1, wherein the plurality of colorant-saving profiles includes a graphics colorant-saving profile configured such that a plurality of input color values each having a same hue is converted to a plurality of output color values, the plurality of output color values having a third hue and a fourth hue different from the third hue, and
   wherein the processor executes the color conversion process according to the graphics colorant-saving profile when the processor judges the type of the object as a graphics.

3. The image processor according to claim 1, wherein the plurality of colorant-saving profiles includes a photo colorant-saving profile configured such that a ratio of the colorant amount used for colors in a light region in the image is greater than a ratio of the colorant amount used for colors in a dark region in the image, and
   wherein the processor executes the color conversion process according to the photo colorant-saving profile when the processor judges the type of the object as a photo.

4. A non-transitory computer readable storage medium storing a set of program instructions installed on and executed by an image processor, the set of program instructions comprising:
   determining whether or not a prescribed setting is set for image data including a plurality of input color values, an image which corresponds to the image data, having a plurality of regions adjacent to each other, the plurality of input color values corresponding to the plurality of regions, respectively, the image data being subjected to a color conversion process for converting the plurality of input color values to a plurality of output color values, each of the plurality of output color values indicating color value of a colorant used for printing the image, and the image data having object data corresponding to an object to be printed in the image,
   judging a type of the object included in the image, and
   executing the color conversion process for the image data according to a normal profile when it is determined that the prescribed setting is not set for the image data, and executing the color conversion process for the image data according to a colorant-saving profile configured such that an amount of colorant to be used in the colorant-saving profile is smaller than that in the normal profile when it is determined that the prescribed setting is set for the image data, wherein one of the plurality of input color values is converted to one of the plurality of output color values according to the colorant-saving profile in the color conversion process, the one of the plurality of input color values having a first hue, the one of the plurality of output color values having a second hue different from the first hue, wherein the colorant-saving profile includes a plurality of colorant-saving profiles, the plurality of colorant-saving profiles including a text colorant-saving profile configured such that a ratio of the colorant amount used for a text color in the text colorant-saving profile to the colorant amount used for the text color in the normal profile is greater than a ratio of the colorant amount used for a color other than the text color in the text colorant-saving profile to the colorant amount used for the colors other than the text color in the normal profile, the text color being preset as a color to be used for text, and executing, when the type of the object is judged as a text, the color conversion process according to the text colorant-saving profile.

5. An image processor comprising:

a processor; and a memory storing instructions that, when executed by the processor, causes the image forming device to perform:

determining whether or not a prescribed setting is set for image data including a plurality of input color values, an image which corresponds to the image data having a plurality of regions adjacent to each other, the plurality of input color values corresponding to the plurality of regions, respectively, the image data being subjected to a color conversion process for converting the plurality of input color values to a plurality of output color values each of the plurality of output color values indicating color value of a colorant used for printing the image, the image data having object data corresponding to an object to be printed in the image, judging a type of the object included in the image: and executing, when the processor determines that the prescribed setting is not set for the image data, the color conversion process for the image data according to a normal profile, and that when the processor determines the prescribed setting is set for the image data, the color conversion process for the image data according to a colorant-saving profile configured such that an amount of colorant to be used in the colorant-saving profile is smaller than that in the normal profile, wherein one of the plurality of input color values is converted to one of the plurality of output color values according to the colorant-saving profile in the color conversion process, the one of the plurality of input color values having a first hue, the one of the plurality of output color values having a second hue different from the first hue, wherein the colorant-saving profile includes a plurality of colorant-saving profiles, the plurality of colorant-saving profiles including a text colorant-saving profile configured such that a ratio of the colorant amount used for a light color in the text colorant-saving profile to the colorant amount of the light color in the normal profile is greater than a ratio of the colorant amount used for a dark color in the text colorant-saving profile to the colorant amount of the dark color in the normal profile, the light color representing color gradations from white to elementary color, the dark color representing color gradations from the elementary color to black, and wherein the processor executes, when the processor judges the type of the object as a text, the color conversion process according to the text colorant-saving profile.

6. The image processor according to claim 5, wherein the plurality of colorant-saving profiles includes a graphics colorant-saving profile configured such that a plurality of input color values each having a same hue is converted to a plurality of output color values, the plurality of output color values having a third hue and a fourth hue different from the third hue, and wherein the processor executes the color conversion process according to the graphics colorant-saving profile when the processor judges the type of the object as a graphics.

7. The image processor according to claim 5, wherein the plurality of colorant-saving profiles includes a photo colorant-saving profile configured such that a ratio of the colorant amount used for colors in a light region in the image is greater than a ratio of the colorant amount used for colors in a dark region in the image, and wherein the processor executes the color conversion process according to the photo colorant-saving profile when the judging judges the type of the object as a photo.

8. A non-transitory computer readable storage medium storing a set of program instructions installed on and executed by an image processor, the set of program instructions comprising:

determining whether or not a prescribed setting is set for image data including a plurality of input color values, an image which corresponds to the image data having a plurality of regions adjacent to each other, the plurality of input color values corresponding to the plurality of regions, respectively, the image data being subjected to a color conversion process for converting the plurality of input color values to a plurality of output color values, each of the plurality of output color values indicating color value of a colorant used for printing the image and the image data having object data corresponding to an object to be printed in the image, judging a type of the object included in the image, and executing the color conversion process for the image data according to a normal profile when it is determined that the prescribed setting is not set for the image data and executing the color conversion process for the image data according to a colorant-saving profile configured such that an amount of colorant to be used in the colorant-saving profile is smaller than that in the normal profile when it is determined that the prescribed setting is set for the image data, wherein one of the plurality of input color values is converted to one of the plurality of output color values according to the colorant-saving profile in the color conversion process, the one of the plurality of input color values having a first hue, the one of the plurality of output color values having a second hue different from the first hue, wherein the colorant-saving profile includes a plurality of colorant-saving profiles, the plurality of colorant-saving profiles including a text colorant-saving profile configured such that a ratio of the colorant amount used for a light color in the text colorant-saving profile to the colorant amount of the light color in the normal profile is greater than a ratio of the colorant amount used for a dark color in the text colorant-saving profile to the colorant amount used of the dark color in the normal profile, the light color representing color gradations from white to elementary color, the dark color representing color gradations from the elementary color to black, and executing, when the type of the object is judged as a text, the color conversion process according to the text colorant-saving profile.

* * * * *